United States Patent
Bengtsson et al.

(10) Patent No.: US 8,085,708 B2
(45) Date of Patent: Dec. 27, 2011

(54) METHODS, SYSTEMS, AND DEVICES FOR ESTABLISHING A REGISTRATIONLESS DATA COMMUNICATION CONNECTION BETWEEN ELECTRONIC DEVICES

(75) Inventors: Henrik Bengtsson, Lund (SE); Troed Sangberg, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 850 days.

(21) Appl. No.: 11/564,617

(22) Filed: Nov. 29, 2006

(65) Prior Publication Data

US 2008/0101278 A1    May 1, 2008

Related U.S. Application Data

(60) Provisional application No. 60/862,937, filed on Oct. 25, 2006.

(51) Int. Cl.
*G06F 15/16* (2006.01)
*H04J 3/00* (2006.01)
*H04M 3/16* (2006.01)
*H04L 29/06* (2006.01)

(52) U.S. Cl. ........ 370/328; 709/203; 370/464; 455/411; 713/160

(58) Field of Classification Search .......... 370/328, 370/340, 475, 338; 455/413, 433, 414.1; 709/203, 223; 713/160–169; 726/16–32
See application file for complete search history.

(56) References Cited

U.S. PATENT DOCUMENTS

| | | | | |
|---|---|---|---|---|
| 2002/0077131 A1* | 6/2002 | Mizell et al. | ............... | 455/466 |
| 2005/0232191 A1* | 10/2005 | Wills | ............... | 370/328 |
| 2007/0206573 A1* | 9/2007 | Silver | ............... | 370/352 |

FOREIGN PATENT DOCUMENTS

| | | |
|---|---|---|
| EP | 1616432 A1 | 11/2004 |
| GB | 2342807 A | 4/2000 |
| WO | WO 99/01999 A1 | 1/1999 |
| WO | WO 00/51375 A1 | 8/2000 |
| WO | WO 2004/095818 A1 | 11/2004 |

OTHER PUBLICATIONS

Notification of Transmittal of the International Search Report and the Written Opinion of the International Searching Authority, or the Declaration corresponding to PCT/EP2007/054359 mailed on Jun. 26, 2007.

Chinese Office Action and English Translation (14 pages), corresponding Chinese Application No. 200780039852.X; Apr. 26, 2011.

* cited by examiner

*Primary Examiner* — George Eng
*Assistant Examiner* — Nizar Sivji
(74) *Attorney, Agent, or Firm* — Myers Bigel & Sajovec, P.A.

(57) ABSTRACT

A method of operating a mobile terminal to establish a data communication connection with an electronic device includes receiving a message from the electronic device via a wireless wide-area network. The message includes Internet Protocol (IP) connection information for establishing the data communication connection with the electronic device. For example, the message may be an SMS message, and the IP connection information may include an IP address and/or port number associated with the electronic device. The data communication connection is established with the electronic device responsive to receiving the message and based on the IP connection information included in the message. Related methods, devices, and computer program products are also discussed.

46 Claims, 3 Drawing Sheets

METHODS, SYSTEMS, AND DEVICES FOR ESTABLISHING A REGISTRATIONLESS DATA COMMUNICATION CONNECTION BETWEEN ELECTRONIC DEVICES

CROSS-REFERENCE TO RELATED PATENT APPLICATIONS

This application claims priority from U.S. Provisional Application Ser. No. 60/862,937, filed Oct. 25, 2006, the disclosure of which is hereby incorporated by reference herein in its entirety.

FIELD OF THE INVENTION

The present invention relates to communication networks, and more particularly, to establishing data communication connections via communication networks and related devices.

BACKGROUND OF THE INVENTION

Mobile terminals are widely used to provide a variety of communications, multimedia, and/or data processing capabilities. For instance, mobile terminals, such as cell phones, personal digital assistants, and/or laptop computers, may provide storage and/or access to data in a wide variety of multimedia formats, including text, pictures, music, and/or video.

Instant messaging (IM) and Voice Over Internet Protocol (VoIP) are types of communications services that enable users of mobile and/or stationary terminals to communicate in real time over the Internet. For example, in a typical IM application, such as MSN Messenger™, a user may prepare and transmit a text message for delivery to one or more other users of the IM application, typically on a so-called "buddy list". The messages may be transmitted to the other users based on the "usernames" chosen by the other users for that IM application. As such, conventional IM applications may require registration with a server that maintains user information including the separate usernames, and may require addressing using the separate usernames by those registered in the same IM network. Thus, it may not be possible to send an MSN™ message to other users if they are not using MSN Messenger™. Similar problems may exist in conventional VoIP applications. For example, in the Skype™ VoIP application, it may not be possible to place a Skype™ call to another user unless he is also using Skype™, which may limit the ability to communicate with others.

As such, in order to communicate with others using these applications, users may be required to inform other users of their new usernames and/or may require the other users to install the same application. Thus, users may be required to remember several different ways of contacting the same person. Also with IM applications, many users may need to be logged on to communicate with each other. As such, an IM service may require some number (i.e., a "critical mass") of people already using (i.e., registered in and logged on to) the IM server in order to send and/or receive messages. Accordingly, many existing IM and/or VoIP solutions for establishing communications connections between mobile terminals may suffer from several drawbacks.

The IP Multimedia Subsystem (IMS) is a standardized Next Generation Networking (NGN) architecture that may be used to provide multimedia services for users of mobile terminals. IMS may use a VoIP implementation based on a $3^{rd}$ Generation Partnership Project (3GPP) standardized implementation of Session Initiation Protocol (SIP), and may run over the standard Internet Protocol (IP). Existing phone systems (both packet-switched and circuit-switched) may be supported. A multimedia session between two IMS users, between an IMS user and a user on the Internet, and between two users on the Internet may be established using exactly the same protocol. Moreover, the interfaces for service developers may be based on IP protocols. As such, IMS may merge the Internet with the cellular world by using cellular technologies to provide access and Internet technologies to provide services. However, in order to establish a multimedia session between two IMS users, SIP proxy and/or registrar elements may be required to be implemented in each network that is used to connect the two users. As such, establishing a multimedia session between two mobile terminals using IMS may be somewhat cumbersome.

SUMMARY OF THE INVENTION

According to some embodiments of the present invention, a method of operating a mobile terminal to establish a data communication connection with an electronic device includes receiving a message from the electronic device via a wireless wide-area network. The message includes Internet Protocol (IP) connection information for establishing the data communication connection with the electronic device. As such, the data communication connection is established with the electronic device responsive to receiving the message and based on the IP connection information included in the message.

In some embodiments, the wireless wide-area network may be a cellular network, and the message may be received via a control channel of the cellular network. For example, the message may be a Short Messaging System (SMS) message received from the electronic device via a Short Message Service Center (SMSC). The data communication connection may be automatically established responsive to receiving the SMS message.

In other embodiments, a device identifier associated with the mobile terminal may be broadcast via the control channel of the cellular network. The message may be received responsive to broadcasting the device identifier.

In some embodiments, the data communication connection may be established via a traffic channel of the cellular network. In other embodiments, the data communication connection may be established via a wireless local-area network.

In other embodiments, the IP connection information may be an IP address, a MAC address, and/or a port number associated with the electronic device.

In some embodiments, the message may be received at a specific port of the mobile terminal that is associated with a particular communications application. For example, the particular communications application may be an Instant Messaging (IM) application and/or a Voice-over-Internet Protocol (VoIP) application. The particular communications application may be automatically activated responsive to receiving the message, and the data communication connection may be associated with the particular communications application.

In other embodiments, the IP connection information may be associated with a first communication connection between the electronic device and a server. A second communication connection may be established between the mobile terminal and the server, and the IP connection information associated with the first communication connection may be transmitted to the server via the second communication connection. Accordingly, the data communication connection with the electronic device may be established via the server responsive to transmitting the IP connection information.

In some embodiments, the IP connection information may be a connection identifier representing the IP connection information associated with the first communication connection that is generated by the electronic device and/or the server.

In other embodiments, the mobile terminal may be a first mobile terminal, and the electronic device may be a second mobile terminal. The first and second mobile terminals may be associated with different network service providers.

In some embodiments, a second message may be transmitted via the wireless wide-area network. The second message may include second IP connection information for establishing a second data communication connection with the mobile terminal. The second data communication connection may be established responsive to transmitting the message including the second IP connection information.

According to other embodiments of the present invention, a method of operating an electronic device to establish a data communication connection with a mobile terminal includes transmitting a message to the mobile terminal via a wireless wide-area network. The message includes Internet Protocol (IP) connection information for establishing the data communication connection with the electronic device, and the data communication connection is established with the mobile terminal responsive to transmitting the message including the IP connection information to the mobile terminal.

In some embodiments, the wireless wide-area network may be a cellular network, and the message may be transmitted to the mobile terminal via a control channel of the cellular network. The message may be addressed based on a device identifier associated with the mobile terminal.

In other embodiments, the message may be a Short Messaging System (SMS) message. The SMS message may be transmitted to the mobile terminal to initiate the data communication connection between the mobile terminal and the electronic device.

In some embodiments, the data communication connection may be established via a traffic channel of the cellular network. In other embodiments, the data communication connection may be established via a wireless local-area network.

In other embodiments, the message may be transmitted to a specific port of the mobile terminal that is associated with a particular communications application, and the data communication connection may be associated with the particular communications application. For example, the particular communications application may be an Instant Messaging (IM) application and/or a Voice-over-Internet Protocol (VoIP) application.

In some embodiments, a first communication connection may be established between the electronic device and a server. The IP connection information may be associated with the first communication connection. Accordingly, the data communication connection with the mobile terminal may be established via the server responsive to transmitting the message including the IP connection information to the mobile terminal.

In other embodiments, a connection identifier representing the IP connection information associated with the first communication connection may be generated, and the message including the connection identifier may be transmitted to the mobile terminal.

For example, the connection identifier may be generated from the IP connection information using a predetermined hashing algorithm.

According to further embodiments of the present invention, a method for establishing a data communication connection between an electronic device and a mobile terminal, includes establishing a first communication connection with the electronic device, and establishing a second communication connection with the mobile terminal. Internet Protocol (IP) connection information associated with the first communication connection is received from the mobile terminal via the second communication connection. The data communication connection is established between the electronic device and the mobile terminal based on the IP connection information associated with the first communication connection received from the mobile terminal.

In some embodiments, a connection identifier representing the IP connection information associated with the first communication connection may be received from the mobile terminal via the second communication connection. The first communication connection may be identified based on the connection identifier received from the mobile terminal, and the data communication connection between the electronic device and the mobile terminal may be established responsive to identifying the first communication connection.

In some embodiments, the connection identifier representing the IP connection information associated with the first communication connection may be generated using a predetermined hashing algorithm. In other embodiments, the connection identifier may be transmitted to the electronic device via the first communication connection as the IP connection information.

In other embodiments, an SMS message may be transmitted to the mobile terminal via a wireless wide-area network to initiate a data communication connection with the mobile terminal. The SMS message may include the IP connection information associated with the first communication connection.

In some embodiments, the message including the IP connection information may be received at the mobile terminal via the wireless wide-area network. The IP connection information from the SMS message may be transmitted over the second communication connection.

According to still other embodiments of the present invention, a mobile terminal includes a receiver and a controller coupled thereto. The receiver is configured to receive a message from an electronic device via a wireless wide-area network. The message includes Internet Protocol (IP) connection information for establishing the data communication connection with the electronic device. The controller is configured to establish a data communication connection with the electronic device responsive to receiving the message and based on the IP connection information included in the message.

According to still further embodiments of the present invention, an electronic device includes a transmitter and a controller coupled thereto. The transmitter is configured to transmit a message to a mobile terminal via a wireless wide-area network. The message includes Internet Protocol (IP) connection information for establishing a data communication connection with the electronic device. The controller is configured to establish the data communication connection with the mobile terminal responsive to transmission of the message including the IP connection information to the mobile terminal.

According to some embodiments of the present invention, a method of establishing a data communication connection between a mobile terminal and an electronic device includes transmitting and/or receiving a message via a wireless wide-area network based on a publicly-known device identifier associated with the mobile terminal. The message includes private Internet Protocol (IP) connection information for the electronic device. For example, the message may be an SMS message. The data communication connection is established based on the private IP connection information included in the message.

In some embodiments, the publicly-known device identifier may be a phone number associated with the mobile terminal. Also, the private IP connection information may be an IP address associated with the electronic device.

In other embodiments, the private IP connection information may be a connection identifier representing the IP address for the electronic device. For example, the connection identifier may be generated by a random algorithm.

Other methods, systems, devices, and/or computer program products according to other embodiments of the invention will become apparent to one with skill in the art upon review of the following drawings and detailed description. It is intended that all such additional methods, systems, devices, and/or computer program products be included within this description, be within the scope of the present invention, and be protected by the accompanying claims.

DETAILED DESCRIPTION OF EMBODIMENTS OF THE INVENTION

Figure 1:
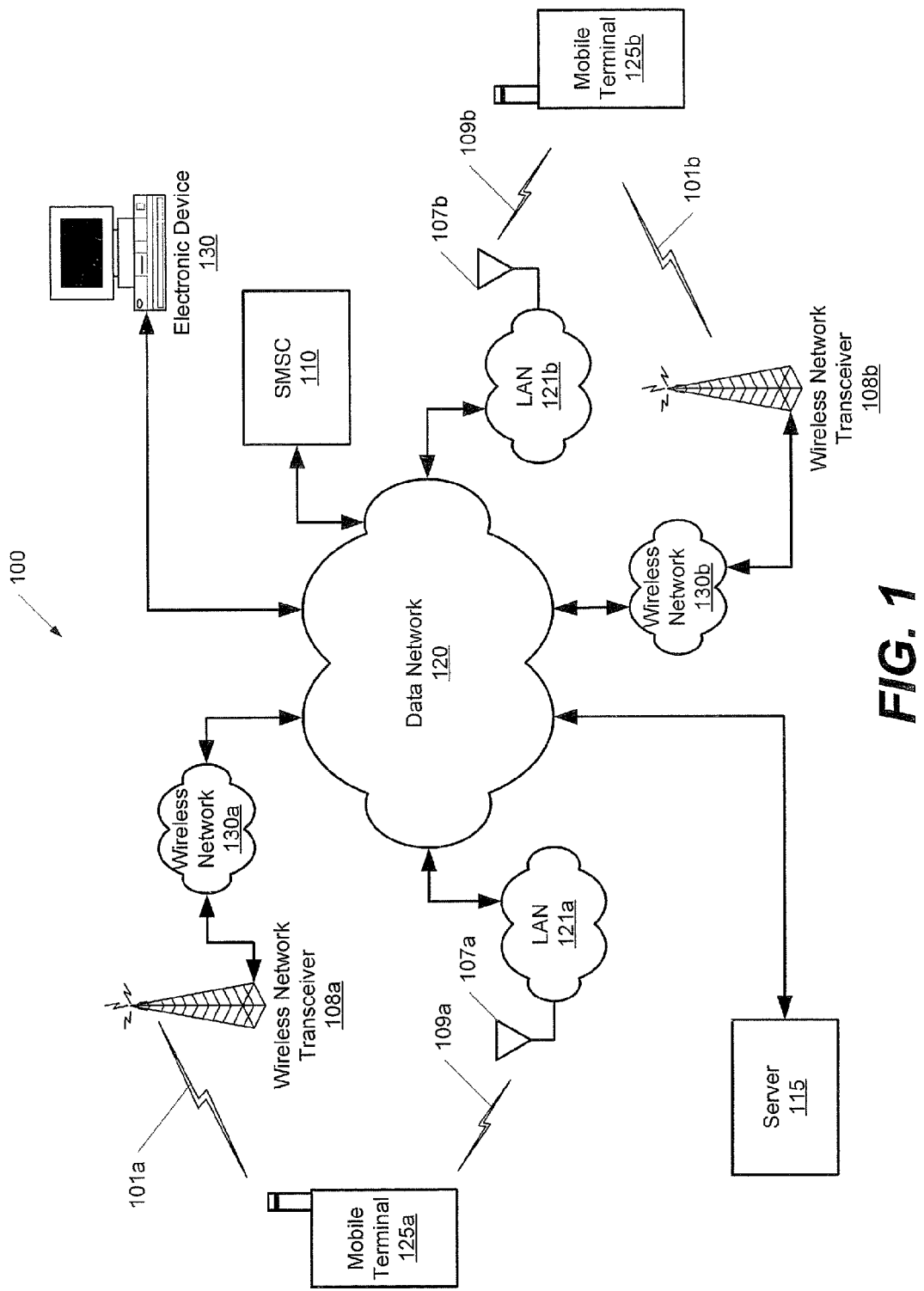
FIG. 1 is a block diagram illustrating a system for establishing data communication connections between electronic devices according to some embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items, and may be abbreviated as "/".

It will also be understood that, although the terms first, second, etc. may be used herein to describe various elements, these elements should not be limited by these terms. These terms are only used to distinguish one element from another. For example, a first mobile terminal could be termed a second mobile terminal, and, similarly, a second mobile terminal could be termed a first mobile terminal without departing from the teachings of the disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "mobile terminal" or "mobile device" may include conventional cell phones, Personal Communications Systems (PCS)/smart phones that may include data processing, voice, video, text message, e-mail and/or Web access capabilities, Personal Digital Assistants (PDA) with wireless communications capabilities, wireless pagers, Blackberry wireless handheld e-mail devices, laptop computers, portable televisions, radios, and/or other devices that may include a radiotelephone transceiver.

Embodiments of the present invention will now be described with reference to FIGS. 1-5. Some embodiments of the present invention may arise from realization that many mobile terminals, such as cell phones, can be addressed using a Short Messaging System (SMS) message addressed to the mobile terminal based on identifying information stored in a Subscriber Identity Module (SIM) card and/or other device identifier associated with the mobile terminal. Accordingly, in some embodiments of the present invention, an electronic device, such as a personal computer (PC) or a mobile phone, may transmit a message to a mobile terminal including IP connection information for establishing a data communication session (or data communication connection) with the electronic device. For example, the message may be an SMS message, and the IP connection information may include unique addressing information, such as an IP address, Media Access Control (MAC) address, and/or port associated with the electronic device. Responsive to receiving this message from the electronic device, the mobile terminal may establish a data communication connection with the electronic device based on the IP connection information included in the message. Thus, the data communication connection may be established between the mobile terminal and the electronic device without registration with a server. The data communication session may be used to provide many types of communications services, such as instant messaging, file-sharing, and/or VoIP services.

FIG. 1 illustrates a communication system 100 for establishing data communication connections between electronic devices according to some embodiments of the present invention. Referring now to FIG. 1, the system 100 includes mobile terminals 125a-125b and an electronic device 130 that are configured to communicate via a data network 120, wireless wide-area networks 130a-130b, and/or local-area networks (LANs) 121a-121b. For example, the mobile terminals 125a and 125b may be cellular telephones, and the electronic device 130 may be a PC. The mobile terminals 125a and 125b may be configured to transmit and/or receive wireless wide-area network communications 110a and 101b, respectively, to access the wireless networks 130a and 130b via wireless network transceivers 108a and 108b. For example, the wireless networks 130a and 130b may be cellular networks, and the mobile terminals 125a and 125b may be configured to operate according to a Global System for Mobile communications (GSM) and/or other standard. In addition, the mobile terminals 125a and 125b may be configured to transmit and/or receive wireless local-area network communications 109a and 109b, respectively, to access the local-area networks 121a and 121b via network access points 107a and 107b. As such, the mobile terminals 125a and 125b may include a wireless local area network (WLAN) transceiver and/or a Public Land Mobile Network (PLMN) transceiver. The communications system 100 may further include a Short Message Service Center (SMSC) 110, one or more remote application servers 115, and/or other network elements as are well known in the art.

The data network 120 may represent a global network, such as the Internet, or other publicly accessible network. The data network 120 may also, however, represent a wide area network (WAN), a local area network (LAN), an Intranet, or other private network, which may not accessible by the general public. Furthermore, the data network 120 may represent a combination of one or more wired and/or wireless public and/or private networks and/or virtual private networks (VPN). The wireless networks 130a and 130b are wide-area networks (WANs) that span a relatively large geographic area. As used herein, a WAN distinguishes a broader telecommunications structure from a local area network (LAN). As such, a WAN excludes Bluetooth, infrared (IR), Wi-Fi, and/or other short-range network connections between devices. Typically, a WAN includes two or more LANs. Devices connected to a WAN are often connected through public and/or private networks, leased lines, and/or satellites. More particularly, WANs may be connected using the public-switched telephone network (PSTN), ISDN (integrated services digital network), frame relay, ATM (a synchronous transfer mode), and/or other high-speed services. The networks 120, 121a, 121b, 130a and/or 130b may utilize multiple wireless and/or wireline access protocols. For example, the wireless access protocols may include GSM GPRS, GSM EDGE, GSM UMTS, CDMA 1×RTT, CDMA EVDO, Wi-Fi, and/or Wi-MAX. The wireline access protocols may include, for example, DSL, cable modem, and/or Ethernet.

Still referring to FIG. 1, the mobile terminal 125a may be configured to transmit a message to the mobile terminal 125b over the wireless network 130a via the wireless wide-area network communication 101a to initiate a data communication session between the devices. The message includes IP connection information for establishing a data communication connection with the mobile terminal 125a. As used herein, "IP connection information" generally refers to addressing information that may be used to route data to a destination device over a network, for example, according to network protocols such as those associated with one or more layers of the Transport Control Protocol/Internet Protocol (TCP/IP) and/or the Open Systems Interconnection (OSI) Reference Model. As such, the IP connection information may include private (i.e., not publicly available) connection information, such as a current IP address, MAC address, and/or port number associated with the mobile terminal 125a for establishing an Internet Protocol (IP) connection between the mobile terminals 125a and 125b. For example, the wireless network 130a may be a cellular network, and the mobile terminal 125a may be configured to transmit the message to the mobile terminal 125b via a control channel of the cellular network. More particularly, the message may be an SMS message addressed to a specific port of the mobile terminal 125b. The port may be associated with a particular communications application, such as an Instant Messaging (IM) and/or a Voice-over-Internet Protocol (VoIP) application. The message may be addressed based on a device identifier associated with the mobile terminal 125b. For example, the device identifier may be a publicly-known and/or publicly-available identifier, such as a phone number and/or a mobile identification number (MIN) and/or electronic serial number (ESN) that may be broadcast by the mobile terminal 125b. In addition, the device identifier may include other identifying information associated with the mobile terminal 125b, such as information stored in a SIM card of the mobile terminal 125b.

The mobile terminal 125b may be configured to receive the message from the mobile terminal 125a via the wireless network 130b and the wireless wide-area network communication 101b. For example, where the message is an SMS message and the wireless network 130b is a cellular network, the mobile terminal 125b may be configured to receive the SMS message over a control channel of the cellular network via the SMSC 110 based on the device identifier associated with the mobile terminal 125b. Based on the IP connection information included in the message, the mobile terminal 125b may be configured to establish a data communication connection with the mobile terminal 125a. For example, the mobile terminal 125b may be configured to establish the data communication connection over a traffic channel of the cellular network via the wireless wide-area network communication 101b. In addition, the mobile terminal 125b may be configured to establish the data communication connection via the wireless local-area network communication 109b and the wireless local-area network 121b. For example, the data communication connection may be established according to a Wi-Fi (IEEE 802.11) and/or a Wi-MAX (IEEE 802.16) standard. Accordingly, the data communication connection may be established without registering the mobile terminals 125a and/or 125b with a server. In addition, the data communication connection may be established irrespective of the particular network service providers associated with the mobile terminals 125a and/or 125b.

Furthermore, in some embodiments, the data communication connection between the mobile terminals 125a and 125b may be established through the server 115. As such, the message transmitted by the mobile terminal 125a may include a connection identifier representing the IP connection information for the mobile terminal 125a. For example, the IP connection information may refer to the server and/or session identification (i.e., chatserver1.chat.com/1846565893), while the connection identifier may be a unique, randomly-generated number and/or other identifier that represents the IP connection information. The connection identifier may be generated using a hashing algorithm and/or other algorithms/techniques to make it more difficult for a rogue attacker to guess the IP connection identification. For example, the connection identifier may be generated using a non-deterministic algorithm. The connection identifier may be included in the message transmitted by the mobile terminal 125a in addition to or in lieu of the actual IP connection information, and may be generated by the mobile terminal 125a and/or by the server 115. Accordingly, after receiving the message from the mobile terminal 125a, the mobile terminal 125b may transmit the connection identifier to the server 115. The server 115 may use the connection identifier to establish the data communication connection between the mobile terminals 125b and 125a, as discussed in the following example.

The following example describes operations for establishing a data communication connection between two instant messaging (IM) applications with reference to the system 100 of FIG. 1. In the example, the IM applications are client applications executing on the mobile terminals 125a and 125b. The IM application may be built-in and/or downloaded to the mobile terminals 125*a* and 125*b*. The mobile terminals 125*a* and 125*b* may operate according to the Internet Protocol Version 4 (IPv4) standard.

Referring to FIG. 1, a user of the mobile terminal 125*a* may wish to send an instant message to a user of the mobile terminal 125*b*. Accordingly, the option for "create new IM message" is selected via the user interface of the mobile terminal 125*a*. Responsive to this selection, the mobile terminal 125*a* establishes a Transmission Control Protocol/Internet Protocol (TCP/IP) connection between the mobile terminal 125*a* and the server 115 via the data network 120. The server 115 may be an IM application server, and may or may not be associated with a specific network operator and/or service provider.

The mobile terminal 125*a* generates a connection identifier representing IP connection information associated with the TCP/IP connection between the mobile terminal 125*a* and the server 115. For example, the connection identifier may be a 128-bit hash code representing the current IP address and/or port number of the mobile terminal 125*a* and/or the server 115 used to establish the TCP/IP connection. However, as noted above, other connection identifers and/or algorithms for generating connection identifiers may also be used. The connection identifier is used by the server 115 to denote the TCP/IP connection between the mobile terminal 125*a* and the server 115. In some embodiments, the connection identifier may be generated by the server 115, and then transmitted to the mobile terminal 125*a* via the TCP/IP connection.

Still referring to FIG. 1, a desired instant message is entered into IM application on the mobile terminal 125*a* via the user interface, and a destination user is selected. For example, the destination user may be chosen from a phone book and/or a "buddy list" associated with the mobile terminal 125*a*. In addition, the destination user may be selected by entering the phone number of the mobile terminal 125*b* associated with the destination user. The desired instant message may be entered while the server and the mobile terminal 125*a* establish the TCP/IP connection and/or generate the connection identifier representing the IP connection information for the TCP/IP connection as discussed above.

After the desired instant message has been entered, the "send" button of the mobile terminal 125*a* is selected, and the IM application executing on the mobile terminal 125*a* sends an SMS message to the mobile terminal 125*b* associated with the destination user. The SMS includes the connection identifier for the TCP/IP connection between the mobile terminal 125*a* and the server 115. More particularly, the mobile terminal 125*a* transmits the SMS message to the SMSC 110 over a control channel of the wireless network 130*a* via the wireless wide-area communication 101*a*, and the SMSC 110 relays the SMS message to a specific port of the mobile terminal 125*b* via a control channel of the wireless network 130*b* and the wireless wide-area network communication 101*b*. However, in some embodiments, the server 115 may be configured to transmit the SMS message including the connection identifier to the mobile terminal 125*b*.

The IM application executing on the mobile terminal 125*b* subscribes to all messages directed to the specific port of the mobile terminal 125*b*. As such, upon receiving the SMS message from the mobile terminal 125*a* via the wireless network 130*b* and the wireless wide-area network communication 101*b*, the mobile terminal 125*b* automatically (i.e., without human intervention) starts the IM application and establishes a TCP/IP connection between the mobile terminal 125*b* and the server 115. For example, the connection identifier and other IP connection information in the SMS message may identify the server 115 and the TCP/IP connection with the mobile terminal 125*a* (for example, "socket://chatserver1.chat.com/1846565893"), or may identify only the TCP/IP connection (for example, "1846565893") if the mobile terminals 125*a* and 125*b* had previously agreed (i.e., through the IM application) on the common server 115. The mobile terminal 125*b* thereby transmits the connection identifier included in the SMS message to the server 115 via the TCP/IP connection between the mobile terminal 125*b* and the server 115.

The server 115 uses the connection identifier (which represents the IP connection information for the TCP/IP connection between the mobile terminal 125*a* and the server 115) to establish a TCP/IP connection between the mobile terminal 125*b* and the mobile terminal 125*a*. More particularly, the server 115 identifies the TCP/IP connection with the mobile terminal 125*a* based on the connection identifier received from the mobile terminal 125*b*. For example, where the connection identifier is a 128-bit hash code, the server 115 may identify the IP address and/or the port number of the mobile terminal 125*a* by comparing the connection identifier with a hash result generated from the IP connection information for the TCP/IP connection between the mobile terminal 125*a* and the server 115 using a predetermined hashing algorithm. As such, based on IP connection information for the mobile terminal 125*a* received from the mobile terminal 125*b*, the server 115 establishes a data communication connection, such as a TCP/IP connection, between the mobile terminals 125*a* and 125*b*.

Thus, the instant message entered in the mobile terminal 125*a*, and any instant messages thereafter, are transmitted to the mobile terminal 125*b* over the established data communication connection. Accordingly, an instant message may be transmitted to a user of the mobile terminal 125*b* even if the mobile terminal 125*b* is not currently registered and/or logged on to the server 115. In other words, the mobile terminal 125*b* may automatically "register" with the server 115 responsive to receiving the SMS message from the mobile terminal 125*a*. In some embodiments, the SMS message including the connection identifier for the mobile terminal 125*a* may be sent only once to establish the data communication connection between the mobile terminals 125*a* and 125*b*, and future instant messages may be transmitted over the data communication connection. As such, the network usage costs to the users of the mobile terminals 125*a* and/or 125*b* may be limited to one SMS plus data traffic charges associated with the instant messages.

In some embodiments, the data communication connection between the mobile terminals 125*a* and 125*b* may remain active or "open" for a predetermined period of time. For example, in some embodiments, the data communication connection may remain active for about 30 minutes. As such, any instant messages sent between the mobile terminals 125*a* and 125*b* within the 30 minutes may be transmitted over the data communication connection, while messages sent after the 30 minutes may require the transmission of a new SMS message to establish a new data communication connection, as described above. However, in other embodiments, the data communication connection may remain active until communications are not exchanged between the mobile terminals 125*a* and 125*b* for a predetermined time. Also, the data communication connection may be terminated responsive to a user command.

In addition, in some embodiments, the server 115 may not be required to establish the data communication connection between the mobile terminals 125*a* and 125*b*. For example, Internet Protocol Version 6 (IPv6) may provide an increased number of available IP addresses for networked devices, such that each of the mobile terminals 125a and 125b may have its own unique and/or publicly available IP address. As such, the mobile terminal 125a may be configured to transmit an SMS message including its IP address to the mobile terminal 125b as described above, and the mobile terminal 125b may use the received IP address for the mobile terminal 125a to establish a direct data communication connection with the mobile terminal 125a, without the use of the server 115. In addition, the SMS message from the mobile terminal 125a may include a unique identifier along with its IP address, to be able to differentiate between one or more other devices that may be attempting to connect to the mobile terminal 125a. The unique identifier may also make it more difficult for rogue attackers to guess the connection information and thereby impersonate the intended recipient. Accordingly, by using an SMS (or other message) including IP connection information in conjunction with a communications application (such as a downloadable IM and/or VoIP application), a data communication session between two or more devices may be setup via a server (for example, in IPv4 networks) and/or without a server (for example, in IPv6 networks).

Although FIG. 1 illustrates exemplary systems for establishing data communication connections between electronic devices, it will be understood that the present invention is not limited to such configurations, but is intended to encompass any configuration capable of carrying out the operations described herein. For example, although described in the preceding example with reference to instant messaging (IM) applications executing on the mobile terminals 125a and 125b, it is to be understood that some embodiments of the present invention may be used to establish a data communication connection between any two applications and/or devices where at least one of the devices is associated with a unique, permanent, and/or publicly known available device identifier (such as a phone number, MIN, ESN, and/or identifying information stored in a SIM) and/or may otherwise be directly addressed. Accordingly, a device configured to transmit an SMS or other message including private IP connection information for that device, such as the electronic device 130, may establish a data communication connection with a receiving device, such as the mobile terminal 125b, based on the device identifier of the receiving device. Likewise, an electronic device including a SIM card and/or other unique device identifier, such as the electronic device 130, may be configured to receive a message including IP connection information for establishing a data communication connection with the device that transmitted the message without registration with the server 115. Also, while the IP address of the server 115 and/or the mobile terminal 125a may be included in the IP connection information, the format may be dependent on the network used. Moreover, other addressing schemes (e.g., addressing a PC based on a SIP address) may be used to establish communications connections between devices according to some embodiments of the present invention. Also, although described with reference to an IM application, it is to be understood that the data communication connection may be used in conjunction with many other types of communications applications, such as file-sharing applications and/or VoIP applications. More generally, although described above with reference to particular devices having particular functionalities, the functionalities of the particular devices of the system 100 of FIG. 1 may depend on the configuration of the system for establishing data communication connections between electronic devices according to some embodiments of the present invention.

Figure 2:
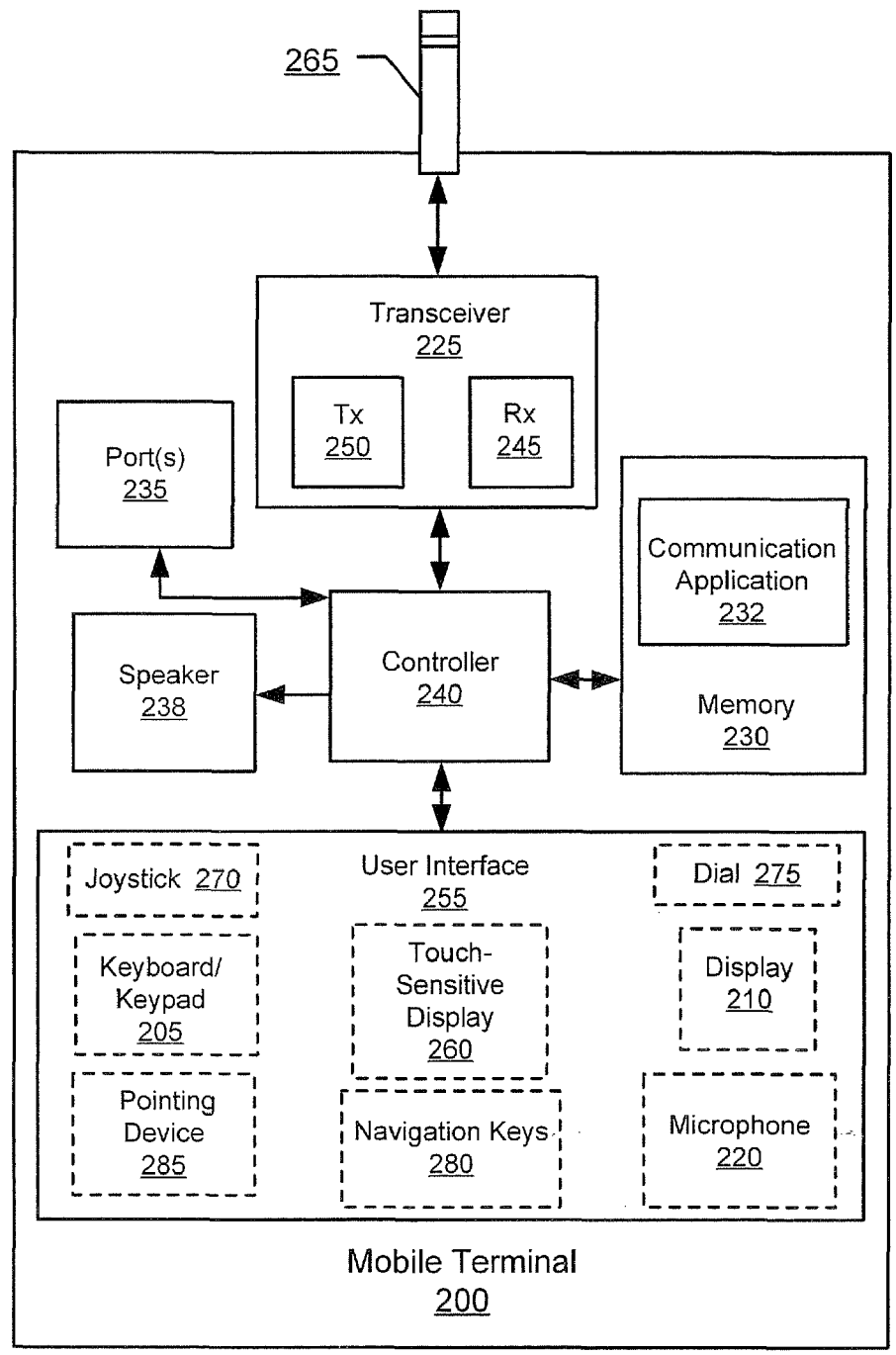
FIG. 2 is a block diagram illustrating a mobile terminal configured to establish a data communication connection with an electronic device according to some embodiments of the present invention.

FIG. 2 is a schematic block diagram illustrating a mobile terminal 200 configured to establish a data communication connection with an electronic device according to some embodiments of the present invention. In some embodiments, the mobile terminal 200 may correspond to one of the mobile terminals 125a-125b of FIG. 1. As shown in FIG. 2, the mobile terminal 200 includes a transceiver 225, an antenna 265, a controller 240, a memory 230, a speaker 238 and a user interface 255. Depending on the functionalities offered by the mobile terminal 200, the user interface 255 may include a microphone 220, a display 210 (such as a liquid crystal display), a joystick 270, a keypad 205, a touch sensitive display 260, a dial 275, navigation/directional keys 280, and/or a pointing device 285 (such as a mouse, track ball, touch pad, etc.). However, additional and/or fewer elements of the user interface 255 may actually be provided. For example, the touch sensitive display 260 may be provided in a personal digital assistant (PDA) that does not include a display 210, a keypad 205, and/or a pointing device 285.

The transceiver 225 includes a transmitter circuit 250 and a receiver circuit 245, which respectively transmit outgoing radio frequency signals and receive incoming radio frequency signals via an antenna 265. The radio frequency signals may include both traffic and control signals (e.g., paging signals/messages for incoming calls), which may be used to establish and maintain communication with another party or destination. For example, the transceiver 225 may include a public land mobile network (PLMN) transceiver and/or a wireless local area network (WLAN) transceiver. As such, the mobile terminal 200 may use the PLMN transceiver and/or the WLAN transceiver to establish a wireless data communication session/connection with a server and/or other electronic device via a base station and/or access point of a wireless network. The wireless data communication connection may be a packet-switched connection, such as that provided by the Enhanced Data GSM Environment (EDGE) standard, the General Packet Radio Service (GPRS) standard, and/or the Universal Mobile Telecommunications System (UMTS) standard, or a circuit-switched connection. In addition, the wireless data communication connection may be established according to a wireless local-area networking standard, such as Bluetooth, Wi-Fi, and/or Wi-MAX, using the WLAN transceiver. Network security for the wireless local-area network (such as encryption and/or authentication) may be provided according to the applicable network standard being used. While a single antenna 265 is illustrated in FIG. 2 by way of example, separate antennas may be provided for the PLMN transceiver and/or the WLAN transceiver. Alternatively, multiple antennas may be shared by the PLMN transceiver and WLAN transceiver, and/or multiple antennas may be provided for one or both of the PLMN transceiver and WLAN transceiver.

The controller 240 is coupled to the transceiver 225, the memory 230, the speaker 238, and the user interface 255. The controller 240 may be, for example, a commercially available or custom microprocessor configured to coordinate and manage operations of the transceiver 225, the memory 230, the speaker 238, and/or the user interface 255. The memory 230 may represent a hierarchy of memory that may include volatile and/or nonvolatile memory, such as removable flash, magnetic, and/or optical rewritable nonvolatile memory. As shown in FIG. 2, the memory 230 may include a communications application 232. The communication application(s) 232 may be, for example, a file-sharing application, an instant messaging application, and/or a VoIP application. The communications application 232 may be built-in and/or may be downloaded to the mobile terminal 200, for example, via the transceiver 225.

The foregoing components of the mobile terminal 200 may be included in many conventional mobile terminals and their functionality is generally known to those skilled in the art. It should be further understood that, as used herein, the term "mobile terminal" or "mobile device" may include conventional cell phones, Personal Communications Systems (PCS)/smart phones that may include data processing, voice, video, text message, e-mail and/or Web access capabilities, Personal Digital Assistants (PDA) with wireless communications capabilities, wireless pagers, Blackberry wireless handheld e-mail devices, laptop computers, portable televisions, radios, and/or other devices that may include a radiotelephone transceiver.

Still referring to FIG. 2, the transceiver 225 is configured to transmit a message to another electronic device via a wireless wide-area network. More particularly, the PLMN transceiver may be configured to transmit the message via a control channel of a cellular network. For example, the message may be a Short Messaging System (SMS) message, and the PLMN transceiver may transmit the message to the electronic device via a Short Message Service Center (SMSC). The transmission of the message may be initiated by the communications application 232. For example, where the communications application 232 is an IM application, the SMS message (including the IP connection information) may be generated by the IM application responsive to creation of a new IM message. The message includes IP connection information for establishing a data communication connection with the mobile terminal 200. For example, the IP connection information may include private connection information, such as an IP address, a MAC address, and/or a port number associated with the mobile terminal 200. As such, the receiving device (and/or an application executing on the receiving device) may be configured to use the IP connection information for the mobile terminal 200 to setup a data communication connection with the mobile terminal 200 without prior registration with a server.

In addition, the transceiver 225 is configured to receive a message from another electronic device, such as the electronic device 130 of FIG. 1, via a wireless wide-area network. More particularly, the PLMN transceiver may be configured to receive the message via a control channel of a cellular network based on a publicly-known device identifier. For example, the PLMN transceiver may broadcast a device identifier associated with the mobile terminal 200, such as a MIN and/or ESN, over the control channel, and may receive the message over the control channel based on the broadcast device identifier. The message includes IP connection information for establishing a data communication connection with the electronic device, such as an IP address, a MAC address, and/or a port number associated with the electronic device. For example, the message may be an SMS message received via an SMSC.

Responsive to receiving the message, the controller 240 is configured to establish a data communication connection with the electronic device based on the IP connection information included in the message. More particularly, the controller 240 may be configured to receive the message from a specific port 235 of the mobile terminal 200. The port 235 may be associated with the communications application 232 stored in the memory 230. For example, the communications application 232 may be a file-sharing, instant messaging, and/or VoIP application. As such, the controller 240 may automatically (i.e., without human intervention) launch and/or activate the communications application 232 responsive to receiving the message via the wireless wide-area network, and may establish the data communication connection using the received IP connection information responsive to activation of the communications application 232. For example, the controller 240 may be configured to establish the data communication connection with the electronic device via a traffic channel of the cellular network using the PLMN transceiver. In addition, the controller 240 may be configured to establish the data communication connection with the electronic device via a wireless local-area network, such as a Wi-Fi or a Wi-MAX network, using the WLAN transceiver.

Moreover, in some embodiments, the controller 240 may be configured to establish a data communication connection between the mobile terminal 200 and another electronic device through a server, such as the server 115 of FIG. 1. For example, in some embodiments, the mobile terminal 200 (and/or a communication application 232 executing thereon) may be configured to initiate the data communication connection. The communications application 232 may be a client application, and the server may be an application server. More particularly, to provide communication services via the communications application 232, the controller 240 may establish a TCP/IP connection with the server. In addition, the transceiver 225 may transmit a message (such as an SMS message) including IP connection information associated with the TCP/IP connection to the electronic device via a wireless wide-area network, such as a cellular network. The IP connection information may be an IP address, a MAC address, and/or port number of the mobile terminal 200 and/or the server that is associated with the TCP/IP connection. In addition, in some embodiments, the controller 240 may be configured to generate a connection identifier representing the IP connection information associated with the TCP/IP connection. For example, the connection identifier may be a 128-bit hash code representing the IP address associated with the TCP/IP connection. As such, the transceiver 225 may be configured to transmit the message including the connection identifier to the electronic device via the control channel of the cellular network. Upon receiving the connection identifier from the electronic device via a separate TCP/IP connection, the server may identify the TCP/IP connection with the mobile terminal 200 to establish the data communication connection between the electronic device and the mobile terminal 200.

In other embodiments, the mobile terminal 200 (and/or the communication application 232) may be configured to establish the data communication connection through the server responsive to receiving a message from another electronic device, such as the electronic device 130 of FIG. 1, via a wireless wide-area network. For example, the electronic device may establish a first TCP/IP connection with the server, and the transceiver 225 may receive the message from the electronic device including IP connection information (and/or a connection identifier representing the IP connection information) associated with the first TCP/IP connection. More particularly, the message may be received at a specific port 235 associated with the communication application 232, and the controller 240 may automatically launch the communication application 232 responsive to receiving the message. Responsive to activation of the communications application 232, the controller 240 may establish a second TCP/IP connection between the mobile terminal 200 and the server, and the transceiver 225 may transmit the IP connection information for the first TCP/IP connection to the server via the second communication connection. Thus, the mobile terminal 200 may automatically "register" with the server responsive to receiving the message from the electronic device. Accordingly, the server may use the IP connection information to identify the first TCP/IP connection with the electronic device, and may thereby establish the data communication connection between the mobile terminal 200 and the electronic device without prior registration.

Although FIG. 2 illustrates an exemplary mobile terminal that may be used to establish a data communication connection with an electronic device according to some embodiments of the present invention, it will be understood that the present invention is not limited to such configuration, but is intended to encompass any configuration capable of carrying out the functionality described herein. For example, although illustrated in FIG. 2 as a mobile terminal 200, the functionality described herein may be implemented in a stationary and/or other electronic device that may not include a wireless transceiver, such as the electronic device 130 of FIG. 1. More particularly, such an electronic device may be configured to transmit a message including its IP connection information to another device based on a publicly-known device identifier associated with the other device. In addition, where the electronic device is associated with a unique device identifier as described above, the electronic device may also be configured to receive a message including private IP connection information for another device. More generally, while particular functionalities are shown in particular blocks by way of illustration, functionalities of different blocks and/or portions thereof may be combined, divided and/or eliminated.

Figure 3:
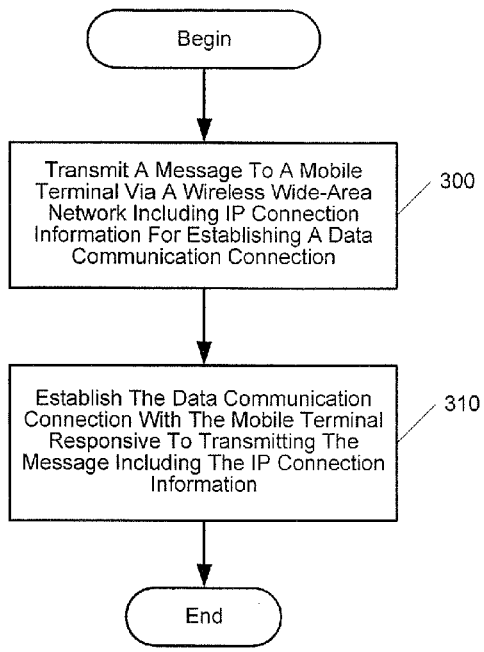
FIGS. 3-5 are flowcharts illustrating operations for establishing data communication connections between electronic devices according to some embodiments of the present invention.

Exemplary operations for establishing data communication connections between electronic devices according to some embodiments of the present invention will now be described with reference to the flowcharts of FIGS. 3 to 5. FIG. 3 is a flowchart illustrating exemplary operations that may be performed by an electronic device, such as the electronic device 130 of FIG. 1, for establishing data communication connections according to some embodiments of the present invention. Referring now to FIG. 3, a message is transmitted to a mobile terminal via a wireless wide-area network at Block 300. The message includes IP connection information for establishing a data communication connection with the electronic device. The IP connection information may be private (i.e., not publicly-available) connection information, such as an IP address, a MAC address, and/or a port number associated with the electronic device. The message may be transmitted via a control channel of a cellular network. For example, the message may be a Short Messaging System (SMS) message, and may be transmitted over the control channel of the cellular network via a Short Message Service Center (SMSC). The message may be addressed based on a device identifier associated with the mobile terminal, such as a mobile identification number (MIN), an electronic serial number (ESN), and/or identifying information stored in a SIM card of the mobile terminal. In addition, the message may be addressed to a specific port of the mobile terminal that is associated with a particular application, such as an Instant Messaging (IM) application and/or a Voice-over-Internet Protocol (VoIP) application.

At Block 310, the data communication connection is established with the mobile terminal responsive to transmitting the message including the IP connection information. The data communication connection may be an IP connection established via a traffic channel of the cellular network. The data communication connection may also be established via a wireless local-area network, such as a Wi-Fi and/or a Wi-MAX network. In addition, in some embodiments, the data communication connection may be established through a server, such as the server 115 of FIG. 1. For example, prior to transmitting the message to the mobile terminal, a first communication connection may be established between the electronic device and the server. The IP connection information transmitted to the mobile terminal may be associated with the first communication connection between the electronic device and the server, and may be used to establish the data communication connection with the mobile terminal via the server.

Figure 4:
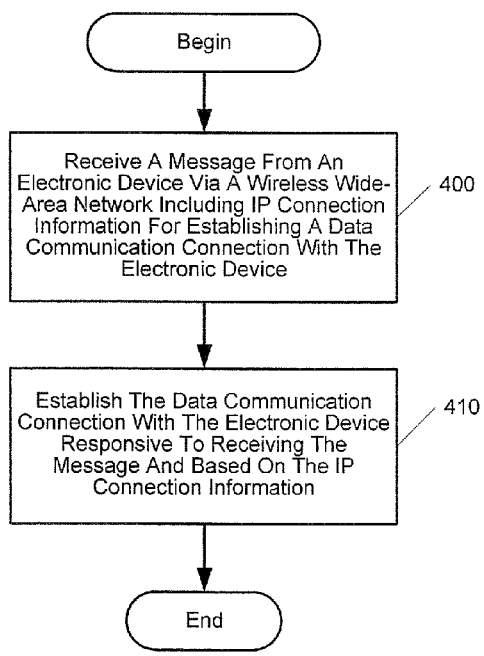

FIG. 4 is a flowchart illustrating exemplary operations that may be performed by a mobile terminal, such as the mobile terminals 125a and/or 125b of FIG. 1, for establishing data communication connections according to some embodiments of the present invention. Referring now to FIG. 4, a message from an electronic device is received via a wide-area network at Block 400. The message includes IP connection information for establishing a data communication connection with the electronic device. For example, the IP connection information may include an IP address, a MAC address, and/or a port number associated with the electronic device. The message may be received via a control channel of a cellular network. For example, the message may be a Short Messaging System (SMS) message, and may be received over the control channel via a Short Message Service Center (SMSC). The message may be received based on a device identifier associated with the mobile terminal. For example, the device identifier may be publicly-known identifier that is broadcast via the control channel, such as a mobile identification number (MIN), an electronic serial number (ESN), and/or other identifying information stored in a SIM card of the mobile terminal.

At Block 410, the data communication connection is established with the electronic device responsive to receiving the message and based on the IP connection information-included in the message. The data communication connection may be an IP connection established between the mobile terminal and the electronic device. For example, the message from the electronic device may be received at a specific port of the mobile terminal that is associated with a particular application, such as an Instant Messaging (IM) application and/or a Voice-over-Internet Protocol (VoIP) application, and the application may be automatically activated to establish the data communication connection with the electronic device using the IP connection information. The data communication connection may be established via a traffic channel of the cellular network and/or via a wireless local-area network, such as a Wi-Fi and/or a Wi-MAX network. Accordingly, the data communication connection may be established without prior registration with a server. In addition, where the electronic device is connected to an application server via first communication connection, a second communication connection may be established between the mobile terminal and the server responsive to receiving the message from the electronic device. The IP connection information included in the message may be transmitted to the server over the second communication connection to automatically register the mobile terminal with the application server, and the data communication connection between the mobile terminal and the electronic device may be established through the application server.

Figure 5:
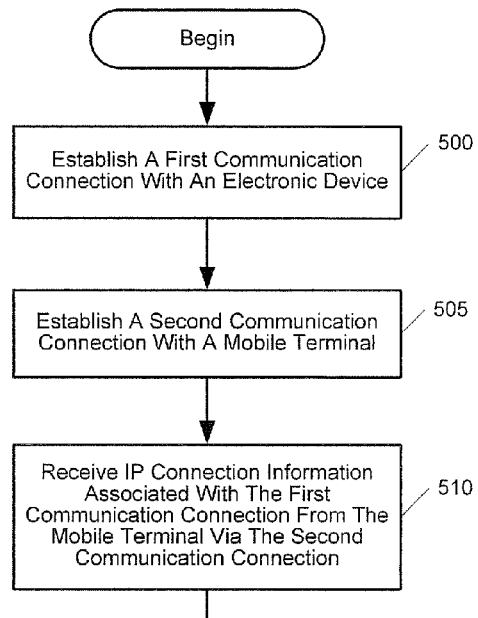

FIG. 5 is a flowchart illustrating exemplary operations that may be performed by a server, such as the server 115 of FIG. 1, for establishing data communication connections between electronic devices according to some embodiments of the present invention. Referring now to FIG. 5, a first communication connection is established with an electronic device, such as the electronic device 130 of FIG. 1, at Block 500. The electronic device may be a fixed and/or mobile electronic device, and may be configured to communicate with one or more other electronic devices via a wired and/or wireless communication connection. IP connection information associated with the first communication connection, such as an IP address, a MAC address, and/or a port number, may provided to the electronic device via the first communication connection. More particularly, a connection identifier representing the IP connection information associated with the first communication connection may be generated and transmitted to the electronic device over the first communication connection. The connection identifier may be a unique, random number generated using a hashing algorithm and/or other algorithms/techniques. For example, the connection identifier may be a 128-bit hash code representing the IP address and/or port number associated with the first communication connection.

At Block 505, a second communication connection is established with a mobile terminal, such as the mobile terminal 125b of FIG. 1. For example, the first and/or second communication connections may be Internet Protocol (IP) connections. The IP connection information associated with the first communication connection is received from the mobile terminal via the second communication connection at Block 510. More particularly, the connection identifier representing the IP connection information associated with the first communication connection may be received from the mobile terminal over the second communication connection. For example, a message (such as an SMS message) including the connection identifier may be transmitted from the electronic device to the mobile terminal via a wireless wide-area network, and the connection identifier may thereby be transmitted to the server from the mobile terminal via the second communication connection. Accordingly, the first communication connection may be identified based on the connection identifier received from the second mobile terminal. For instance, where the connection identifier is a 128-bit hash code as described above, the IP address and/or the port number associated with the first communication connection may be identified by comparing the connection identifier with a hash result generated from the IP connection information for the first communication connection using the predetermined hashing algorithm.

Accordingly, a data communication connection between the electronic device and the mobile terminal is established at Block 515. More particularly, the data communication connection is established based on the IP connection information for the first communication connection with the electronic device that was received from the mobile terminal via the second communication connection. Thus, the data communication connection may be established without prior registration of the electronic device and/or the mobile terminal with the server. The data communication connection may be used to provide a variety of communications services, such as file sharing, instant messaging, and/or VoIP services.

Using the above techniques, many different communications services that may require a direct data communication connection between electronic devices may be offered. For example, a group chat may be possible by establishing data communication connections between multiple devices using an SMS infrastructure and/or some server-based applications as described above. In addition, some embodiments of the present invention may be combined with methods, systems, and/or devices described in U.S. patent application Ser. No. 11/469,733 filed Sep. 1, 2006, entitled "AUTOMATIC SPREAD OF APPLICATIONS", and U.S. patent application Ser. No. 11/532,253 filed Sep. 15, 2006, entitled "AUTOMATIC SPREAD OF APPLICATIONS", the disclosures of which are incorporated by reference herein in their entireties. As such, some embodiments of the present invention may allow for communication with conventional and/or older mobile terminals, while newer mobile terminals may be preloaded with features according to some embodiments of the present invention. In addition, the cost to the user for such data communication connections may be relatively small (i.e., one SMS plus traffic charges) in contrast to a per-SMS pricing scheme.

Thus, according to some embodiments of the present invention, a single SMS message may be used as a data bearer for IP connection information associated with an electronic device. Accordingly, a user of a mobile terminal may receive the SMS based on the phone number and/or other device identifier associated with the mobile terminal, without the need for separate user names (such as those used in IM applications) that may be unknown to many friends and/or acquaintances. As such, it may be possible to provide IP connection information via an SMS message to any device including a SIM card and/or other unique device identifier. For example, in the telecom world, any user with a mobile phone may be accessible, in contrast to conventional instant messaging where there may be only a few hundred million users. Thus, according to some embodiments of the present invention, a registrationless data communication connection may be established between two electronic devices, and many problems associated with conventional IM and/or VoIP applications may be avoided.

As will be appreciated by one of skill in the art, the present invention may be embodied as a method, system, device, and/or computer program product. Accordingly, the present invention may take the form of an entirely hardware embodiment, a software embodiment, and/or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package. The program code may execute entirely on a mobile phone or only partly on the mobile phone and partly on one or more other devices. In the latter scenario, the other devices may be connected to the multimedia device through a wired and/or wireless wide area network (WAN), or the connection may be made to an external computer (for example, through the Internet using an Internet Service Provider). In some embodiments, the program code may also execute either partly or entirely on a remote device.

Furthermore, the present invention was described in part above with reference to flowchart illustrations and/or block diagrams of methods, systems, devices, and computer program products according to some embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It should be noted that, in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A method of operating a mobile terminal to establish a data communication connection with an electronic device, the method comprising:
receiving, at the mobile terminal, a message from the electronic device via a wireless wide-area network, the message containing a connection identifier representing Internet Protocol (IP) connection information that identifies a first communication connection between the electronic device and a server including a socket associated therewith and respective port numbers of the electronic device and the server that provide each side of the first communication connection, wherein the connection identifier is generated using a predetermined hashing algorithm;
establishing a second communication connection between the mobile terminal and the server responsive to receiving the message containing the connection identifier from the electronic device;
transmitting the connection identifier from the mobile terminal to the server via the second communication connection; and
establishing the data communication connection with the electronic device via the server responsive to transmitting the connection identifier to the server.

2. The method of claim 1, wherein the wireless wide-area network comprises a cellular network, and wherein receiving the message comprises:
receiving the message via a control channel of the cellular network.

3. The method of claim 2, further comprising:
broadcasting a device identifier associated with the mobile terminal via the control channel of the cellular network, wherein receiving the message comprises receiving the message responsive to broadcasting the device identifier.

4. The method of claim 2, wherein the message comprises a Short Messaging System (SMS) message, and wherein receiving the message comprises:
receiving the SMS message from the electronic device via a Short Message Service Center (SMSC),
wherein establishing the data communication connection comprises automatically establishing the data communication connection responsive to receiving the SMS message.

5. The method of claim 2, wherein establishing the data communication connection comprises:
establishing the data communication connection via a traffic channel of the cellular network.

6. The method of claim 2, wherein establishing the data communication connection comprises:
establishing the data communication connection via a wireless local-area network.

7. The method of claim 1, wherein the IP connection information further comprises an IP address, MAC address, and/or port number associated with the electronic device.

8. The method of claim 1, wherein receiving the message comprises:
receiving the message at a specific port of the mobile terminal that is associated with a particular communications application; and
automatically activating the particular communications application responsive to receiving the message,
wherein the data communication connection is associated with the particular communications application.

9. The method of claim 8, wherein the particular communications application comprises an Instant Messaging (IM) application and/or a Voice-over-Internet Protocol (VoIP) application.

10. The method of claim 1, wherein the mobile terminal comprises a first mobile terminal, wherein the electronic device comprises a second mobile terminal, and wherein the first and second mobile terminals are associated with different network service providers.

11. The method of claim 1, further comprising:
transmitting a second message via the wireless wide-area network including second IP connection information for establishing a second data communication connection with the mobile terminal; and
establishing the second data communication connection responsive to transmitting the message including the second IP connection information.

12. An article of manufacture for establishing a data communication connection between a mobile terminal and an electronic device, the article of manufacture comprising:
a non-transitory computer readable storage medium including computer readable program code therein configured to carry out the method of claim 1.

13. A method of operating an electronic device to establish a data communication connection with a mobile terminal, the method comprising:
establishing a first communication connection between the electronic device and a server;
transmitting a message to the mobile terminal via a wireless wide-area network, the message containing a connection identifier representing Internet Protocol (IP) connection information that identifies the first communication connection between the electronic device and the server including a socket associated therewith and respective port numbers of the electronic device and the server that provide each side of the first communication connection, wherein the connection identifier is generated using a predetermined hashing algorithm; and establishing the data communication connection with the mobile terminal via the server responsive to transmitting the message including the connection identifier to the mobile terminal.

14. The method of claim 13, wherein the wireless wide-area network comprises a cellular network, and wherein transmitting the message comprises:

transmitting the message to the mobile terminal via a control channel of the cellular network, wherein the message is addressed based on a device identifier associated with the mobile terminal.

15. The method of claim 14, wherein the message comprises a Short Messaging System (SMS) message, and wherein transmitting the message comprises:

transmitting the SMS message to the mobile terminal to initiate the data communication connection between the mobile terminal and the electronic device.

16. The method of claim 14, wherein establishing the data communication connection comprises:

establishing the data communication connection via a traffic channel of the cellular network.

17. The method of claim 14, wherein establishing the data communication connection comprises:

establishing the data communication connection via a wireless local-area network.

18. The method of claim 13, wherein transmitting the message comprises:

transmitting the message to a specific port of the mobile terminal that is associated with a particular communications application, wherein the data communication connection is associated with the particular communications application.

19. An article of manufacture for establishing a data communication connection between a mobile terminal and an electronic device, the article of manufacture comprising:

a non-transitory computer readable storage medium including computer readable program code therein configured to carry out the method of claim 13.

20. A method for establishing a data communication connection between an electronic device and a mobile terminal, the method comprising:

establishing a first communication connection with the electronic device;

generating, using a predetermined hashing algorithm, a connection identifier representing Internet Protocol (IP) connection information that identifies the first communication connection with the electronic device, including a socket associated therewith and respective port numbers of the electronic device and the server that provide each side of the first communication connection;

establishing a second communication connection with the mobile terminal;

receiving the connection identifier from the mobile terminal via the second communication connection; and establishing the data communication connection between the electronic device and the mobile terminal based on and responsive to receiving the connection identifier from the mobile terminal.

21. The method of claim 20, further comprising:

transmitting the connection identifier to the electronic device via the first communication connection.

22. The method of claim 20, further comprising:

transmitting a Short Messaging System (SMS) message to the mobile terminal via a wireless wide-area network, the SMS message including the IP connection information that identifies the first communication connection to initiate a data communication connection with the mobile terminal.

23. The method of claim 22, further comprising:

receiving the SMS message including the IP connection information at the mobile terminal via the wireless wide-area network; and transmitting the IP connection information from the SMS message over the second communication connection.

24. The method of claim 20, wherein the first communication connection, the second communication connection, and/or the data communication connection comprises a Transmission Control Protocol/Internet Protocol (TCP/IP) connection.

25. The method of claim 20, wherein the IP connection information comprises an IP address, MAC address, and/or port number associated with the electronic device.

26. A system for establishing a data communication connection between a mobile terminal and an electronic device, wherein the system is configured to carry out the method of claim 20.

27. An article of manufacture for establishing a data communication connection between a mobile terminal and an electronic device, the article of manufacture comprising:

a non-transitory computer readable storage medium including computer readable program code therein configured to carry out the method of claim 20.

28. A mobile terminal, comprising:

a receiver configured to receive a message from an electronic device via a wireless wide-area network, the message containing a connection identifier representing Internet Protocol (IP) connection information that identifies a first communication connection between the electronic device and a server including a socket associated therewith and respective port numbers of the electronic device and the server that provide each side of the first communication connection, wherein the connection identifier is generated using a predetermined hashing algorithm;

a transmitter configured to establish a second communication connection between the mobile terminal and the server and transmit the connection identifier from the mobile terminal to the server via the second communication connection responsive to receiving the message containing the connection identifier from the electronic device; and a controller coupled to the transmitter and the receiver and configured to establish a data communication connection with the electronic device via the server responsive to transmission of the connection identifier to the server.

29. The mobile terminal of claim 28, wherein the wireless wide-area network comprises a cellular network, and wherein the receiver is configured to receive the message via a control channel of the cellular network.

30. The mobile terminal of claim 29, wherein the transmitter is configured to broadcast a device identifier associated with the mobile terminal via the cellular network, wherein the receiver is configured to receive the message via the control channel based on the device identifier, and wherein the controller is configured to establish the data communication connection via a traffic channel of the cellular network.

31. The mobile terminal of claim 29, further comprising:
a local-area network transceiver coupled to the controller, wherein the controller is configured to establish the data communication connection via a wireless local-area network.

32. The mobile terminal of claim 29, wherein the message comprises a Short Messaging System (SMS) message, wherein the receiver is configured to receive the SMS message from the electronic device via a Short Message Service Center (SMSC), and wherein the controller is configured to automatically establish the data communication connection responsive to receiving the SMS message.

33. The mobile terminal of claim 28, wherein the IP connection information comprises an IP address, a MAC address, and/or a port number associated with the electronic device.

34. The mobile terminal of claim 28, wherein the controller is configured to receive the message at a specific port of the mobile terminal that is associated with a particular communications application and automatically activate the particular communications application responsive to receiving the message, and wherein the data communication connection is associated with the particular communications application.

35. The mobile terminal of claim 34, wherein the particular communications application comprises an Instant Messaging (IM) application and/or a Voice-over-Internet Protocol (VoIP) application.

36. The mobile terminal of claim 28, wherein the electronic device comprises a second mobile terminal, and wherein the first and second mobile terminals are associated with different network service providers.

37. The mobile terminal of claim 28, wherein the transmitter is further configured to transmit a second message including second IP connection information for establishing a second data communication connection with the mobile terminal, and wherein the controller is configured to establish the second data communication connection responsive to transmitting the message including the second IP connection information.

38. An electronic device, comprising:
a transmitter configured to establish a first communication connection between the electronic device and a server and transmit a message to a mobile terminal via a wireless wide-area network, the message containing a connection identifier representing Internet Protocol (IP) connection information that identifies the first communication connection between the electronic device and the server including a socket associated therewith and respective port numbers of the electronic device and the server that provide each side of the first communication connection, wherein the connection identifier is generated using a predetermined hashing algorithm; and
a controller coupled to the transmitter and configured to establish a data communication connection with the mobile terminal via the server responsive to transmission of the message containing the connection identifier to the mobile terminal.

39. The device of claim 38, wherein the wireless wide-area network comprises a cellular network, and wherein the transmitter is configured to transmit the message to the mobile terminal via a control channel of the cellular network based on a device identifier associated with the mobile terminal.

40. The device of claim 39, wherein the message comprises a Short Messaging System (SMS) message, and wherein the transmitter is configured to transmit the SMS message to the mobile terminal to initiate the data communication connection between the mobile terminal and the electronic device.

41. The device of claim 39, wherein the controller is configured to establish the data communication connection via a traffic channel of the cellular network.

42. The device of claim 39, further comprising:
a local-area network transceiver coupled to the controller, wherein the controller is configured to establish the data communication connection via a wireless local-area network.

43. The device of claim 38, wherein the transmitter is configured to transmit the message to a specific port of the mobile terminal that is associated with a particular communications application, and wherein the data communication connection is associated with the particular communications application.

44. A method of establishing a data communication connection between a mobile terminal and an electronic device, the method comprising:
transmitting and/or receiving a message via a wireless wide-area network based on a publicly-known device identifier associated with the mobile terminal, the message containing a connection identifier representing private Internet Protocol (IP) connection information that identifies a first communication connection between the electronic device and a server including a socket associated therewith and respective port numbers of the electronic device and the server that provide each side of the first communication connection, wherein the connection identifier is generated using a predetermined hashing algorithm; and
establishing the data communication connection via the server based on the IP connection information contained in the message.

45. The method of claim 44, wherein the publicly-known device identifier comprises a phone number associated with the mobile terminal, and wherein the private IP connection information comprises an IP address associated with the electronic device.

46. The method of claim 44, wherein the message comprises an SMS message.

* * * * *